June 10, 1924.
N. K. CHANEY
1,497,544
ADSORBENT CHARCOAL AND PROCESS FOR MAKING THE SAME
Original Filed June 30, 1919
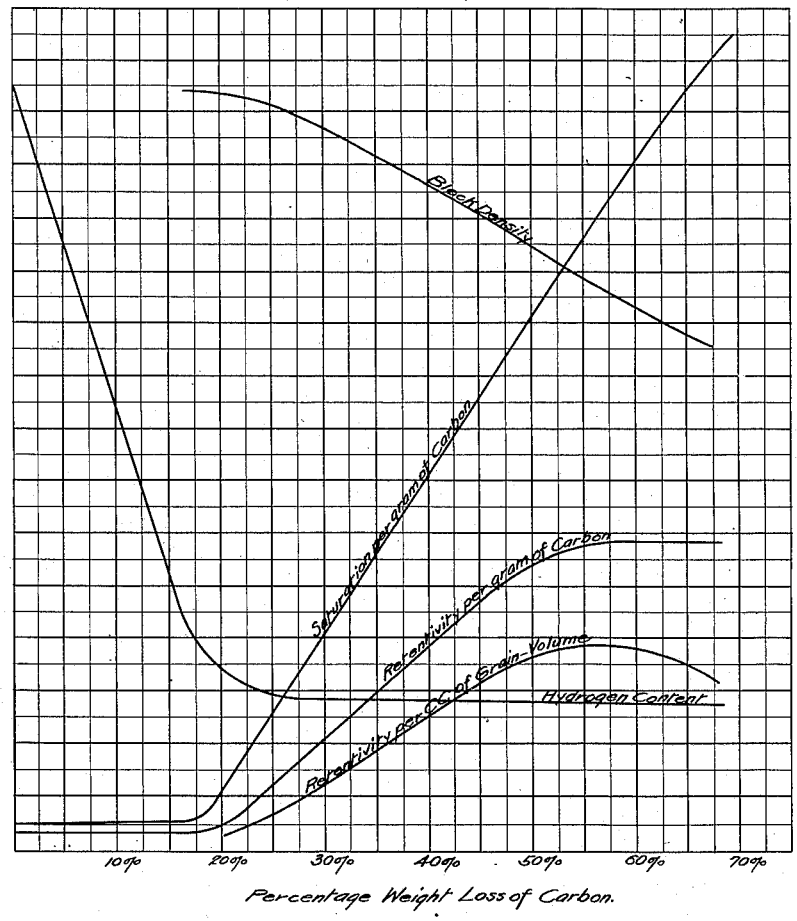
Inventor:
Newcomb K. Chaney
By Byrnes, Townsend & Brickenstein,
Attorneys.

Patented June 10, 1924.

1,497,544

UNITED STATES PATENT OFFICE.

NEWCOMB K. CHANEY, OF KEW GARDENS, NEW YORK.

ADSORBENT CHARCOAL AND PROCESS FOR MAKING THE SAME.

Original application filed June 30, 1919, Serial No. 307,620. Divided and this application filed November 18, 1921. Serial No. 516,225.

*To all whom it may concern:*

Be it known that I, NEWCOMB K. CHANEY, a citizen of the United States, residing at Kew Gardens, in the county of Queens and State of New York, have invented certain new and useful Improvements in Adsorbent Charcoal and Processes for Making the Same, of which the following is a specification.

This invention relates to processes of manufacturing highly adsorptive carbon, and to the novel products resulting therefrom.

It has long been known that charcoal will sorb gases, and investigations in recent years have shown that charcoal prepared from certain nuts has generally a higher adsorptive capacity than that prepared from other material. For example, charcoal derived from the shell of the cocoanut is a fair adsorbent for certain gases. When made by the usual processes, however, it is incapable of effective use in preventing the passage of difficultly adsorbable gases. In illustration of this, its adsorbent life with respect to chlorpicrin, under conditions described hereinafter, is only five minutes, and is similarly brief with certain other toxic gases.

I have discovered a method of activation by which the adsorbent capacity of such charcoals may be greatly increased. Cocoanut charcoal, for example, treated according to my invention, shows an adsorbent life with respect to chlorpicrin substantially two hundred times that of cocoanut charcoal made in the usual manner. There is a corresponding increase in adsorptive capacity for other gases.

I have found that cocoanut charcoal is composed of an active or highly adsorbent carbon base containing adsorbed hydrocarbons. Such charcoal is a member of that class of carbonaceous materials which for convenience of reference will be designated "primary carbon". Other members of this class, each characterized by being a complex of active base and adsorbed hydrocarbons, are cokes resulting from the low temperature distillation of bituminous coals, mineral bitumen or the like; bituminous and anthracite coal; and many commercial grades of dense vegetable charcoal. The present description will be restricted to the preparation of active carbon from cocoanut charcoal or equivalent nut charcoals, such as that derived from cohune, palm and Brazil nuts, or the like. It is to be understood, however, that the invention is also applicable to charcoals derived from other sources, but having properties approaching those of nut charcoals. Such are, for example, charcoals made from very hard woods. It is my present belief, however, that the products obtainable from wood charcoals, however dense, are all more or less inferior to the products obtainable from nut charcoals.

According to my invention, dense charcoal is rendered highly adsorptive by a selective oxidation which removes adsorbed hydrocarbons, leaving the active carbon base substantially intact. In its preferred embodiment my invention further contemplates such oxidation treatment of the residual active carbon base as will increase the surface of the particle per unit of volume, this increase of surface relative to volume being preferably carried to the maximum attainable degree for carbon particles of a given size.

The invention will now be described in detail, referring by way of example to cocoanut charcoal as the starting material. This material may be prepared by distilling the nut shells in the manner usually adopted when ordinary charcoal is to be prepared, the temperature being preferably not in excess of 600° C. After the distillation is complete, a calcination to around 800° C. serves to densify the charcoal and is sometimes desirable in the case of nut charcoals. If desired, oxidizing conditions may be maintained during the heating of the shells, in order to minimize so far as practicable the proportion of adsorbed hydrocarbons in the residual carbon.

In this connection it may be explained that in the ordinary process of distillation of carbonaceous materials at relatively low temperatures, active carbon is first formed by the thermal decomposition of unstable hydrocarbons. This active carbon adsorbs a further quantity of hydrocarbons, and these adsorbed hydrocarbons are thereby stabilized to a remarkable extent; so that they are retained under conditions of temperature, pressure, etc., at which they would otherwise be quickly eliminated. Sufficiently prolonged heating of the primary carbon at extremely high temperatures will, it is true, serve partially to remove or break down the adsorbed hydrocarbons, but on account of the stability of the adsorption-complex the temperatures necessary for this purpose are so high that another difficulty is encountered, namely, that of so-called "gas-treating", which results in the deposition of inactive carbon in and on the active carbon base; and since this inactive carbon is decidedly more difficult to oxidize than is active carbon, it cannot be successfully removed from the active carbon by differential oxidation. Hence it is essential to the proper practice of this process that the deposition of inactive carbon should be substantially avoided at every stage of the operation, including the production of the primary carbon. The tendency to deposit inactive carbon is small when nut and hardwood charcoals are used, but excessive temperatures should nevertheless be avoided.

The charcoal is first subjected to a process of differential oxidation, whereby the exposed adsorbed hydrocarbons (meaning thereby those hydrocarbons which are accessible to the oxidizing agent) are substantially eliminated, with minimum oxidation only of the active carbon base. This may be effected in various ways, but preferably by subjecting the charcoal to a current of steam or carbon dioxid or mixtures thereof at carefully controlled temperatures, preferably lying between 800°–1000° C. It is advantageous to treat the charcoal in relatively thin layers. This treatment with gaseous oxidizing agents is continued until the exposed hydrocarbons are substantially eliminated, and the product may then be cooled to such a temperature that it may be discharged from the furnace without danger of igniting. If the operation has been properly carried out, the product, aside from a small ash content, will consist substantially of active carbon. It will be found more active, as regards adsorptive capacity for gases, than any charcoal heretofore available, whether of animal or vegetable origin.

Gaseous chlorin is capable of combining with and bringing about the elimination of adsorbed hydrocarbons, and may be either used alone or preferably in alternation with steam. It acts, therefore, in this reaction essentially as an oxidizing agent, and is included in the term as employed herein. Air may be used, but at decidedly lower temperatures (around 350°–450° C.) and with less satisfactory results, especially as regards the percentage yield of active carbon.

The differential oxidation of adsorbed hydrocarbons as described above, when properly carried out, yields a carbon product having the maximum activity per unit of surface. However, the amount of surface exposed per unit volume of the material may vary widely, and I prefer to subject the active carbon, either before or after cooling, to a further treatment by limited oxidation, whereby the surface exposed per unit of volume is brought practically to a maximum. This I accomplish by subjecting the active carbon, after being freed from exposed hydrocarbons, to a current of steam or other gaseous oxidizing agent, preferably at a temperature of about 800°–1000° C., the operation being continued until the apparent density of the particle falls to a value lying between 0.5 and 1.0; and preferably until the apparent density more or less closely approximates the value 0.66. I have demonstrated experimentally that this is the point at which the particle possesses the maximum exposed surface relative to its volume.

The values given above are for what I term "block density", that is to say, the apparent density of a carbon block or granule per se. Adsorbent carbon is generally used in granular form and the block density differs from the apparent density of the entire granular mass, since the latter value takes into account the voids between the granules. For gas warfare adsorbent carbon is usually ground to pass through a 8 mesh onto a 10 mesh Tyler standard screen. With this fineness the apparent density 0.66 in the particles corresponds to about 0.41 apparent density of the entire granular mass.

Since an apparent density of substantially 0.66 is the optimum value for adsorbent carbon, it follows that carbon having an original density below this value cannot be given by activation the maximum adsorptive capacity per unit of volume of which carbon is capable, although such activation may greatly increase the adsorptive capacity by the removal of adsorbed hydrocarbons.

By activating cocoanut charcoal in accordance with my process, all of the exposed hydrocarbons can be differentially oxidized without bringing the apparent density down to the desired value of about 0.66. The oxidation can therefore be further continued to channel out the active carbon iself, and thereby to increase still further the ratio of exposed surface to volume. If this channeling out process be continued until the apparent density is 0.66, the adsorbent life of the product will be found to be approximately 1000 minutes. It should however be understood that my invention is not limited to reducing the apparent density of the dense forms of charcoal to the absolute value 0.66, inasmuch as commercially practicable results are obtained with such dense forms at apparent densities lying between 0.5 and 1.0 as previously explained. If the limited oxidation be continued below the lower limit of 0.5, the effect is to decrease the exposed surface per unit of volume and thereby to reduce the adsorptive capacity of the product.

In view of the above described relationship between the apparent density and the adsorptive capacity, it will be seen that dense carbonaceous materials should preferably be selected for producing charcoal for activation by my process. Cocoanut charcoal has an average block density of about 1.17, while that of cohune, palm and Brazil nuts varies between 0.80 and 1.30. Charcoal prepared from hard woods may have a block density of from 0.70 to 0.80 and, with the qualification noted above, may be classed with the specified nut charcoals for the purposes of this invention. Charcoal from any of these sources having a block density greater than 0.70 is capable of being activated to the maximum adsorptive capacity characteristic of charcoal. The invention is of course not limited to treatment of charcoal capable of attaining this maximum, as differential oxidation of charcoal of block density less than 0.70 greatly increases its adsorptive capacity.

While I have referred to an adsorbent life of 1000 minutes under standard test conditions as being the approximate maximum value for carbon, it should be understood that this statement applies only to certain definite conditions. For example, carbon ground to pass through a 12 mesh onto a 14 mesh (Tyler standard screens) gives a greater service life than this. However, the standard size of granule is through an 8 onto a 10 mesh screen, so this has been adopted in the standard test which gives the 1000 minute life. This test consists essentially in passing a stream of air containing one part per thousand of chlorpicrin through a layer of 8–10 mesh carbon ten centimeters deep, in sufficient quantities to pass five hundred cubic centimeters of the gas mixture per minute through one square centimeter of surface of the carbon layer, until the effluent gas mixture imparts a distinct coloration to a copper flame indicating a concentration in the neighborhood of one part per hundred thousand of chlorpicrin.

In connection with the above test it should be understood that the adsorption of the gas by the carbon is apparently partly capillary in character, the gas being held in the capillarly interstices, and partly of another kind in which the gas is presumably condensed as a film upon the surface of the carbon. It is found that portions of the retained gas may be rather readily eliminated by subjecting the mass to a current of dry air or other gas, whereas other portions are retained for long periods or indefinitely under this treatment. It is believed that the gas held by capillary adsorption represents the portion which is rather quickly eliminated by the gas current, while the portion which cannot be thus washed out is that which is adsorbed as a film. An adsorption test carried out under conditions as described above may be regarded therefore as a measure of the combined capillary adsorption and film adsorption, that is to say, of the total adsorptive value of the carbon.

The retentivity of the carbon, by which is meant its capacity for retaining the adsorbed gas, may be determined by another form of test consisting essentially in passing a current of dry air over the carbon which has been previously saturated with chlorpicrin or other gas, the retentivity for which is to be measured, until the rate of loss of weight falls below a fixed minimum value. For example, in one form of the test conditions as now used dried air is passed over a sample of gas-saturated carbon at the standard rate of 500 c. c. per minute per square centimeter of section, until the concentration of chlorpicrin in the effluent falls below the fixed value chosen as a standard. For the specific case of chlorpicrin this standard is 35 parts per million. Under these conditions the most active carbon prepared as hereinabove described will retain in the neighborhood of 40% of its weight of chlorpicrin, whereas ordinary forms of carbon will retain amounts of the order of 1% or less; and even the recent German gas-mask carbon does not retain to exceed 10–12% under the same test conditions.

A modified form of the retentivity test, which can be much more quickly performed and affords sharper indications, consists in first saturating the active carbon with gas at room temperatures, and then placing it under high vacuum at 100° C., the charcoal being weighed at about half-hour intervals. The losses in weight are plotted against time and a curve drawn through the points so plotted will become a straight line after the gas held by capillary adsorption has been completely liberated. This usually requires from one to two hours. When subsequent points are found to lie in a straight line, the test may be discontinued. If the straight line portion of the curve is then extrapolated until it intersects the axis of ordinates expressing gas liberated (or retained), the point of intersection gives a value from which may be calculated the specific retentive capacity of the sample. This is because the film-adsorbed gas is slowly given up at a constant rate from the beginning of the heating under vacuum, while the capillary-adsorbed gas is rapidly liberated at a constantly decreasing rate. The values thus obtained are much more definite and sharply re-duplicated than those obtained by the first described test, and lie within a few per cent of these values, being as a rule somewhat lower. For example, samples prepared as described in this specification show under this test normal values of about 30–35% retentivity, with an upper limit of 40% or better, The retentivity of German charcoal under the conditions of this test does not exceed 5%.

A better understanding of various matters hereinbefore referred to will be had from the accompanying drawing, which shows graphically the variations in the properties of a cocoanut charcoal oxidized with steam for various periods. The drawing includes a curve illustrating each of the following: hydrogen-content of the carbon; retentivity (expressed as weight-percentage of carbon-tetrachloride); saturation (also weight-percentage of carbon-tetrachloride); block density; and retentivity per unit volume of carbon, computed from the data used in plotting the "retentivity" and "block density" curves.

It will be observed that the hydrogen-content of the material decreases rapidly for a time and then comes to a practically constant value. The period of rapid decrease obviously corresponds to selective removal of hydrocarbons. It is only after selective removal of hydrocarbons ceases and the active carbon skeleton is laid bare that the saturation and retentivity values become considerable.

It will be understood that the ordinates of the saturation curve represent total sorbed vapor, and therefore include both the carbon-tetrachloride represented by the retentivity curve and that which is held in the capillaries of the carbon. The block density of the carbon diminishes throughout the test, indicating a progressive increase in porosity, and the saturation value increases continuously because of the increase in capillary volume. The "retentivity" reaches a limiting value, however, indicating that beyond a certain point there is no further increase in surface per unit weight of the material, since all the evidence supports the view that retentivity is a surface phenomenon.

Since retentivity with reference to mass of carbon reaches a limiting value, and since mass per unit volume (density) decreases continuously, as shown by one of the curves, it will be apparent that retentivity per unit volume of carbon will fall off beyond a certain maximum, as has been graphically shown on one of the curves. This maximum is important from the industrial and military standpoints, as the space available for the sorbent is often strictly limited.

In defining my invention, however, I do not desire to be restricted to the maximum retentivity of approximately 40% of chlorpicrin, since retentive values in excess of about 20% indicate an altogether novel and highly valuable commercial product. Furthermore, in accordance with my invention such retentivity is imparted to a relatively dense material, the preferred range of block density in the finished product being 0.5 to 1.0 as has already been stated. Even with the density at the lower limit of the preferred range and retentivity of only 20%, it will be seen that grains of the material having an aggregate volume of one cubic centimeter are capable of retaining 100 mg. of chlorpicrin under the described test conditions. The retentivity referred to volume of carbon grains (exclusive of voids) differentiates the product of my invention from prior carbons even more strikingly than does the retentivity referred to weight of carbon, since all the prior carbons having appreciable retentivity were of very low density. While the total adsorption and the retentivity have been expressed in terms of chlorpicrin, by reason of the necessity for having a definite standard, it is to be understood that similar general relations hold for other gases, although of course the absolute weights adsorbed or retained will vary greatly according to the molecular weight, specific gravity, boiling point and other physical constants of the particular gas.

Neither do I desire to be restricted to the maximum adsorbent life of approximately 1000 minutes under the standard test conditions described herein, since an adsorptive life in excess of 225 minutes indicates a material which is both new and useful.

This application is a division of my copending application Serial No. 307,620, filed June 30, 1919.

I claim:

1. Process of making a highly adsorptive carbon from charcoal, comprising subjecting charcoal of block density greater than 0.70 to differential oxidation until the exposed hydrocarbons are substantially eliminated and the residual carbon acquires a retentive value for chlorpicrin in excess of 20% of its weight.

2. Process of making a highly adsorptive carbon from charcoal, comprising subjecting charcoal of block density greater than 0.70 to differential oxidation until the exposed hydrocarbons are substantially eliminated, and subjecting the residual active carbon to limited oxidation until it has acquired substantially the maximum retentivity per unit of volume.

3. Process of making highly adsorptive carbon, comprising subjecting vegetable material adapted to form charcoal of block density greater than 0.70, to low-temperature distillation to expel volatile components while avoiding deposition of inactive carbon, producing thereby a primary carbon consisting essentially of an adsorption-complex of active carbon and stabilized hydrocarbons, subjecting said primary carbon to differential oxidation until the exposed hydrocarbons are substantially eliminated and the residual carbon acquires a retentive value for chlorpicrin in excess of 20% of its weight.

4. Process of making a highly adsorptive carbon, comprising subjecting a vegetable material adapted to form charcoal of block density greater than 0.70, to low-temperature distillation to expel volatile components while avoiding deposition of inactive carbon, producing thereby a primary carbon consisting essentially of an adsorption-complex of active carbon and stabilized hydrocarbons, and subjecting said primary carbon to differential oxidation until the exposed hydrocarbons are substantially eliminated, and subjecting the residual active carbon to limited oxidation until it has acquired a retentivity for chlorpicrin in excess of 100 milligrams per cubic centimeter of grain-volume.

5. Process of making a highly adsorptive carbon, comprising subjecting charcoal having a block density greater than 0.70 and consisting essentially of an adsorption-complex of active carbon and stabilized hydrocarbons, to differential oxidation until the exposed hydrocarbons are substantially eliminated, and subjecting the residual active carbon to limited oxidation until it has acquired a retentivity for chlorpicrin in excess of 100 milligrams per cubic centimeter of grain-volume.

6. Process of making highly adsorptive charcoal from nut charcoal, comprising subjecting the nut charcoal to differential oxidation until the exposed hydrocarbon components are substantially eliminated and the residual carbon acquires a retentivity for chlorpicrin in excess of 20% of its weight.

7. As a new article of manufacture, highly adsorptive carbon such as may be produced by the herein-described process comprising subjecting charcoal having a block density greater than 0.70 and consisting essentially of an absorption complex of active carbon and stabilized hydrocarbons to differential oxidation until the exposed hydrocarbons are substantially eliminated and the residual carbon acquires a retentivity for chlorpicrin in excess of 20% of its weight.

8. As a new article of manufacture, highly absorptive carbon such as may be produced by the herein-described process comprising subjecting charcoal having a block density greater than 0.70 and consisting essentially of an adsorption complex of active carbon and stabilized hydrocarbons to differential oxidation until the exposed hydrocarbons are substantially eliminated, and subjecting the residual active carbon to limited oxidation until it has acquired substantially the maximum retentivity per unit of volume.

9. As a new article of manufacture, nut charcoal having an adsorbent life in excess of 225 minutes on test comprising passing a stream of air containing one part per thousand of chlorpicrin through a layer of 8–10 mesh carbon ten centimeters deep, in sufficient quantities to pass five hundred cubic centimeters of the gas mixture per minute through one square centimeter of surface of the carbon layer, until the effluent gas mixture imparts a distinct coloration to a copper flame.

10. As a new article of manufacture, nut charcoal in granular form having an adsorbent life for chlorpicrin approximating 1000 minutes on test comprising passing a stream of air containing one part per thousand of chlorpicrin through a layer of 8–10 mesh carbon ten centimeters deep, in sufficient quantities to pass five hundred cubic centimeters of the gas mixture per minute through one square centimeter of surface of the carbon layer, until the effluent gas mixture imparts a distinct coloration to a copper flame.

11. As a new article of manufacture, nut charcoal having a retentive value for chlorpicrin in excess of 20% of its weight.

12. As a new article of manufacture, nut charcoal having a retentive value for chlorpicrin of approximately 40% of its weight.

In testimony whereof I affix my signature.

NEWCOMB K. CHANEY.